No. 777,391. PATENTED DEC. 13, 1904.
A. ABRAHAM.
HOE.
APPLICATION FILED DEC. 23, 1903.
NO MODEL.

Witnesses
C. W. Simpson
F. C. Jones

Inventor
A. Abraham
By Chandlee & Chandlee
Attorneys

No. 777,391. Patented December 13, 1904.

UNITED STATES PATENT OFFICE.

ADOLPH ABRAHAM, OF JANESVILLE, MINNESOTA.

HOE.

SPECIFICATION forming part of Letters Patent No. 777,391, dated December 13, 1904.

Application filed December 23, 1903. Serial No. 186,409. (No model.)

*To all whom it may concern:*

Be it known that I, ADOLPH ABRAHAM, a citizen of the United States, residing at Janesville, in the county of Waseca, State of Minnesota, have invented certain new and useful Improvements in Hoes; and I do hereby declare the following to be a full, clear, and exact description of the invention, such as will enable others skilled in the art to which it appertains to make and use the same.

This invention relates to farm implements in general and more particularly to hoes, the object of the invention being to provide an implement or tool of this nature which will be cheap and easy of manufacture, which will be light and durable, and which will be particularly useful in working about corn and similar plants which are to be uncovered and straightened after cultivation.

Figure 1:
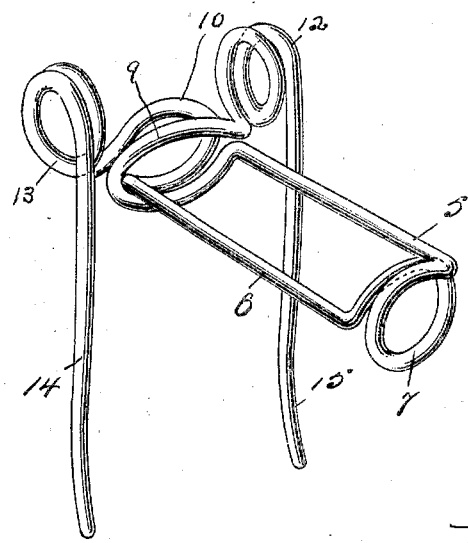
Figure 2:
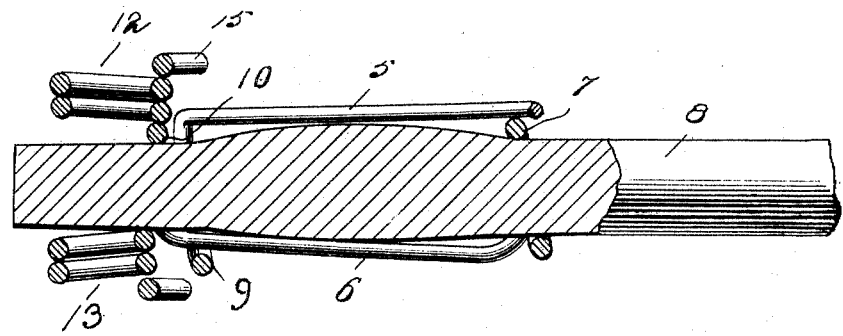

In the drawings forming a portion of this specification, and in which like numerals of reference indicate similar parts in both views, Figure 1 is a perspective view showing the hoe with the handle removed. Fig. 2 is a section taken longitudinally through the shank of the hoe with the handle engaged therewith, a portion of the handle being in top plan.

Referring now to the drawings, the hoe proper is made of a single piece of spring-wire which is bent upon itself to form the spaced members 5 and 6, the central portion of the wire which lies between these spaced members and connects them being bent to form a helix 7, the axis of which lies midway between the said member 5 and 6, this helix 7 being designed to receive the handle 8 of the hoe, which is engaged in the manner hereinafter described. The members 5 and 6, in connection with the helix 7, form the shank of the hoe in connection with transverse loops 9 and 10, which are formed at the ends of the members 5 and 6 opposite to the helix. The loop 9, which is formed at the end of the member 5, extends transversely and around the member 6 and then back to the member 5 and serves to hold the members 5 and 6 against separation, the wire at the end of the loop 9 being bent forwardly and then into helical form to produce the helix 12, the axis of which lies at right angles to the axis of the helix 7. From the helix 12 the wire is bent downwardly at right angles to the member 5 to a point near to its lower end and is then curved rearwardly in the direction of the helix 7. The wire of the member 6 after formation of the loop 10 is bent to form a helix 13, which alines with the helix 12, the wire being then bent downwardly at right angles to the member 6 to a point near its end and is then curved rearwardly. These portions of the wire extending downwardly from the helixes 12 and 13 form tines 14 and 15, which are parallel and in spaced relation. The loops 9 and 10 aline with the helix 7, all of which are expansible.

The handle 8 employed is gradually increased in diameter from its extreme end to a point spaced slightly therefrom and is then gradually decreased in diameter, so that it is, in effect, swelled near to its end. In attaching the handle to the shank of the hoe the swelled portion is passed through the helix 7, so as to lie between it and the loop 9, the tapered end of the handle being engaged in loops 9 and 10, the helix and loops being sprung or expanded as the handle is inserted, after which they contract around the handle and hold the latter securely engaged therewith, it being noted that in order to withdraw the handle the swelled portion must be drawn rearwardly through the helix 7 and the latter must be expanded.

In the use of the hoe the tines are thrust into the ground or passed around the plant, the spring quality of the wire of which the tool is formed being such as to insure yielding of the tines and to prevent breakage of them.

What is claimed is—

1. A tool comprising a shank, said shank having parallel members bent upon themselves into helical form and bent at points short of their ends into registering loops alining with the helix, the portions of the members that extend beyond the loops extending downwardly to form tines, said loops and helix being adapted to receive a handle.

2. A tool comprising an earth-treating portion, a shank including alining expansible loops at the ends thereof, and a handle having a swelled portion adjacent to one end and tapered in both directions from the swelled portion, said handle being engaged with the loop with the swell portion lying therebetween.

In testimony whereof I affix my signature in presence of two witnesses.

ADOLPH ABRAHAM.

Witnesses:
EDWARD MILLER,
WILHELM J. ABRAHAM.